(12) United States Patent
Minkovicz et al.

(10) Patent No.: US 11,562,021 B2
(45) Date of Patent: *Jan. 24, 2023

(54) COORDINATING COMMUNICATION AND/OR STORAGE BASED ON IMAGE ANALYSIS

(71) Applicant: PomVom Ltd., Herzeliya (IL)

(72) Inventors: Yehuda Minkovicz, Herzliya (IL); Shmuel Assa, RaAnana (IL)

(73) Assignee: PomVom Ltd., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,002

(22) Filed: Sep. 28, 2021

(65) Prior Publication Data

US 2022/0012282 A1 Jan. 13, 2022

Related U.S. Application Data

(63) Continuation of application No. 15/745,138, filed as application No. PCT/IL2016/050773 on Jul. 14, 2016, now Pat. No. 11,144,591.

(Continued)

(51) Int. Cl.
*G06F 16/783* (2019.01)
*G11B 27/28* (2006.01)
(Continued)

(52) U.S. Cl.
CPC ............ *G06F 16/784* (2019.01); *G06F 16/29* (2019.01); *G06F 16/583* (2019.01);
(Continued)

(58) Field of Classification Search
CPC ...... G06F 16/784; G06F 16/583; G06F 16/29; H04M 1/7243; G06V 40/161; G10L 15/07; G11B 27/28; G11B 27/32; G06Q 50/01
See application file for complete search history.

(56) References Cited

U.S. PATENT DOCUMENTS

| 7,551,755 B1 | 6/2009 | Steinberg et al. |
| 8,194,986 B2 | 6/2012 | Conwell |

(Continued)

FOREIGN PATENT DOCUMENTS

| CN | 102687146 | 9/2012 |
| CN | 103477350 | 12/2013 |

(Continued)

OTHER PUBLICATIONS

International Preliminary Report on Patentability dated Jan. 25, 2018 From the International Bureau of WIPO Re. Application No. PCT/IL2016/050773. (13 Pages).

(Continued)

*Primary Examiner* — Tadesse Hailu
*Assistant Examiner* — Darrin Hope

(57) ABSTRACT

A method of managing a media file storage relocation and/or editing process that comprises receiving location data indicative a user geographical location of users during a monitored period and a capturing/uploading geographical location and time of each media file, using the file capturing/uploading geographical location and time to identify a spatiotemporal proximity of a group from the users to respective the media file capturing/uploading geographical location of one or more of the media files during a respective the media file capturing/uploading time, detecting member (s) of the group which is imaged in the one or more media files using a recognition function, such as a face and/or voice recognition functions and in response to the detecting, initiating a media file storage relocation process and/or an editing process.

20 Claims, 4 Drawing Sheets

Related U.S. Application Data

(60) Provisional application No. 62/193,247, filed on Jul. 16, 2015.

(51) Int. Cl.
*G11B 27/32* (2006.01)
*H04M 1/7243* (2021.01)
*G06F 16/583* (2019.01)
*G06F 16/29* (2019.01)
*G06K 9/00* (2022.01)
*G10L 15/07* (2013.01)
*G06V 40/16* (2022.01)
*G06Q 50/00* (2012.01)

(52) U.S. Cl.
CPC ............ *G06V 40/161* (2022.01); *G10L 15/07* (2013.01); *G11B 27/28* (2013.01); *G11B 27/32* (2013.01); *H04M 1/7243* (2021.01); *G06Q 50/01* (2013.01)

(56) References Cited

U.S. PATENT DOCUMENTS

| | | | | |
|---|---|---|---|---|
| 8,332,281 | B2* | 12/2012 | Smith | G06Q 30/0621 705/26.5 |
| 8,861,804 | B1* | 10/2014 | Johnson | G06F 16/23 382/218 |
| 2004/0156535 | A1 | 8/2004 | Goldberg et al. | |
| 2005/0105806 | A1 | 5/2005 | Nagaoka et al. | |
| 2008/0037825 | A1 | 2/2008 | Lofgren et al. | |
| 2008/0294774 | A1 | 11/2008 | Fowler et al. | |
| 2012/0200737 | A1 | 8/2012 | Jape et al. | |
| 2012/0250950 | A1 | 10/2012 | Papakipos et al. | |
| 2013/0117365 | A1 | 5/2013 | Padmanabhan et al. | |
| 2014/0196152 | A1 | 7/2014 | Ur et al. | |
| 2019/0012382 | A1 | 1/2019 | Minkovicz et al. | |
| 2019/0147185 | A1* | 5/2019 | Cai | G06V 40/167 726/30 |

FOREIGN PATENT DOCUMENTS

| | | |
|---|---|---|
| CN | 103914634 | 7/2014 |
| CN | 104284252 | 1/2015 |
| WO | WO 2017/009851 | 1/2017 |

OTHER PUBLICATIONS

International Search Report and the Written Opinion dated Feb. 21, 2017 From the International Searching Authority Re. Application No. PCT/IL2016/050773. (20 Pages).

Interview Summary dated Jun. 24, 2020 from the US Patent and Trademark Office Re. U.S. Appl. No. 15/745,138. (3 pages).

Invitation to Pay Additional Fees Dated Oct. 26, 2016 From the International Searching Authority Re. Application No. PCT/IL2016/050773. (2 Pages).

Notice of Allowance dated Jun. 16, 2021 from the US Patent and Trademark Office Re. U.S. Appl. No. 15/745,138. (6 pages).

Notification of Office Action and Search Report dated Jul. 1, 2021 From the Stale Intellectual Property Office of the People's Republic of China Re. Application No. 201680051986.2 and an English Summary. (11 Pges).

Official Action dated Jul. 1, 2019 From the US Patent and Trademark Office Re. U.S. Appl. No. 15/745,138. (23 pages).

Official Action dated Feb. 19, 2020 From the US Patent and Trademark Office Re. U.S. Appl. No. 15/745,138. (23 pages).

Official Action dated Oct. 21, 2020 From the US Patent and Trademark Office Re. U.S. Appl. No. 15/745,138. (24 Pages).

* cited by examiner

COORDINATING COMMUNICATION AND/OR STORAGE BASED ON IMAGE ANALYSIS

RELATED APPLICATIONS

This application is a continuation of U.S. patent application Ser. No. 15/745,138 filed on Jan. 16, 2018, which is a National Phase of PCT Patent Application No. PCT/IL2016/050773 having International Filing Date of Jul. 14, 2016, which claims the benefit of priority under 35 USC § 119(e) of U.S. Provisional Patent Application No. 62/193,247 filed on Jul. 16, 2015. The contents of the above applications are all incorporated by reference as if fully set forth herein in their entirety.

FIELD AND BACKGROUND OF THE INVENTION

The present invention, in some embodiments thereof, relates to media content distribution and, more specifically, but not exclusively, to media content distribution based on location.

There are an increasingly large number of devices that have network connectivity. Over the years, network connectivity has been extended to appliances such as digital cameras and cell phones or tablets with imagers. Various services and applications currently exist with the goal of establishing data connectivity between appliances or people in different network locations. The growth of the Internet and other types of networks has contributed to the numerous networking applications that currently exist. Moreover, the popularity of social networks coupled with increased functionality from portable electronic devices provides opportunities to share and distribute information instantly over networks.

SUMMARY OF THE INVENTION

According to some embodiments of the present invention, there is provided a method of managing a media file storage relocation process. The method comprises receiving location data indicative a user geographical location each of a plurality of users during a monitored period, the location data is acquired by recording outputs of a location module of each of a plurality of client terminals of the plurality of users, receiving a capturing or uploading geographical location and time of each of a plurality of media files, using the file capturing or uploading geographical location and time to identify a spatiotemporal proximity of a group from the plurality of users to respective the media file capturing or uploading geographical location of at least one media file of the plurality of media files during a respective the media file capturing or uploading time, detecting at least one member of the group which is imaged in the at least one media file using a face recognition function, and in response to the detecting, initiating a media file storage relocation process wherein a storage location of the at least one media file is changed from a current storage location to a new storage location associated with the at least one member.

Optionally, the method further comprises identifying a social connection between the at least one member and a user capturing the at least one media file and managing the media file storage relocation process according to the social connection.

Optionally, the method further comprises acquiring from a user capturing the at least one media file and approval to relocate the at least one media file and managing the media file storage relocation process according to the approval.

Optionally, the method further comprises: presenting the at least one media file to the at least one member on a graphical user interface, acquiring a reaction to the at least one media file via a selection on the graphical user interface from the at least one member and managing the media file storage relocation process according to the reaction.

Optionally, the presenting comprises presenting at least one thumbnail of the at least one media file to the at least one member on the graphical user interface.

Optionally, the method further comprises managing a financial transaction between a user capturing the at least one media file and the at least one member and managing the media file storage relocation process according to the financial transaction.

Optionally, the face recognition function is applied using a plurality of face records each indicative of at least one facial feature of one of the plurality of users.

Optionally, the method further comprises establishing a chat session between at least two members of the group.

Optionally, the method further comprises establishing a chat session between at least one member of the group and a capturing user capturing the media file.

Optionally, the plurality of media files are stored in a memory of the plurality of client terminals and wherein the current storage location is on one of the plurality of client terminals and the new storage location is on another of the plurality of client terminals.

Optionally, the method further comprises: receiving a plurality of image segments each depicting at least one face and cropped from one of the plurality of media files, wherein the detecting is performed by applying the face recognition function on the plurality of image segments.

Optionally, the plurality of client terminals comprises a plurality of smartphones of the plurality of users.

Optionally, the method further comprises: monitoring a distribution of the at least one media file in at least one social media network, and updating a user capturing the at least one media file about the distribution.

Optionally, the method further comprises: adding an identifier selected from a group consisting of a watermark, a profile image, a layout, and an icon to the at least one media file.

According to some embodiments of the present invention, there is provided a system of managing a media file storage relocation process. The system comprises at least one network interface adapted to receive from a plurality of client terminals of a plurality of users location module data indicative of a user geographical location each of a plurality of users during a monitored period and adapted to receive a capturing or uploading geographical location and time of each of a plurality of media files, a code store storing a code, a processor adapted to execute the following code instructions of the code: code instructions for using the file capturing or uploading geographical location and time to identify a spatiotemporal proximity of a group from the plurality of users to respective the media file capturing or uploading geographical location of at least one media file of the plurality of media files during a respective the media file capturing or uploading time, code instructions for detecting at least one member of the group which is imaged in the at least one media file using a face recognition function, and code instructions for initiating, in response to the detecting, a media file storage relocation process wherein a storage location of the at least one media file is changed from a current storage location to a new storage location associated with the at least one member.

According to some embodiments of the present invention, there is provided a method of establishing a chat session. The method comprises identifying a first identity of a capturing user capturing a media file depicting at least one imaged user, applying a face recognition function on the media file to identify at least one second identity of the at least one user, displaying a plurality of chat user interfaces on a display of each of at least two client terminals of at least two of the capturing user and the at least one imaged user for establishing a chat session, and receiving messages via the plurality of chat user interfaces and displaying the messages on respective the display of each of the at least two client terminals during the chat session.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
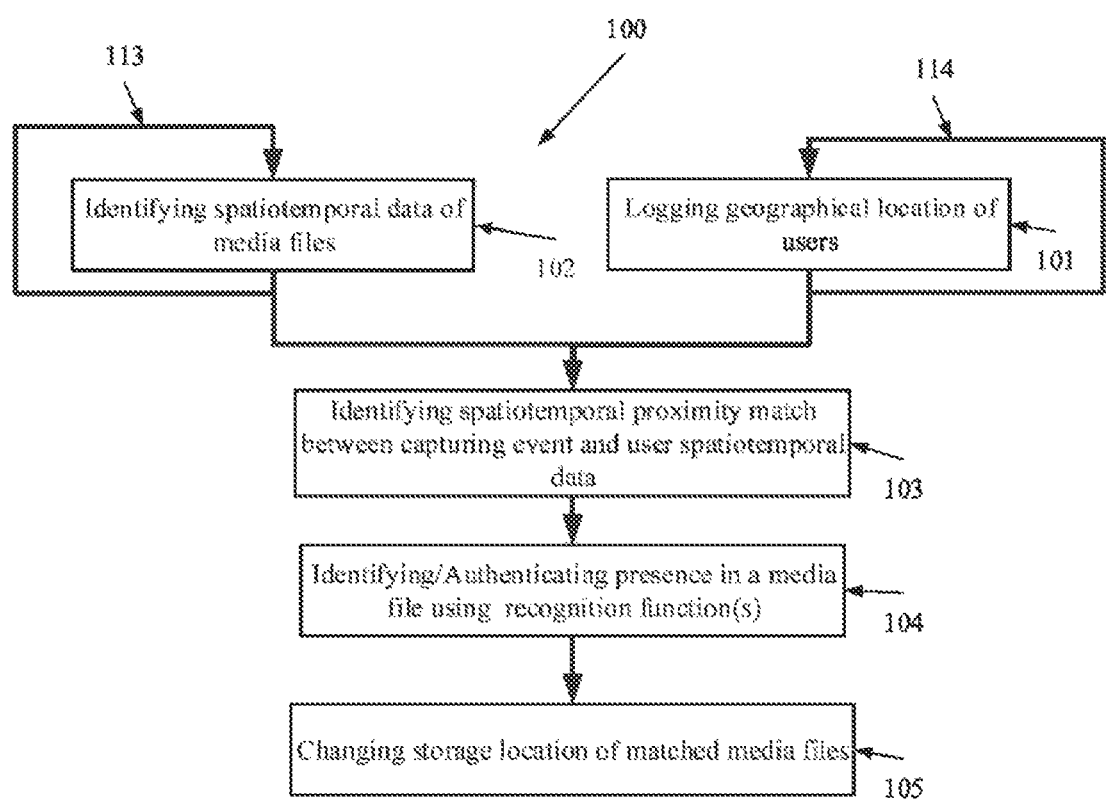
FIG. 1 is a flowchart of a method of managing the storage of media files by matching, in each of various time intervals, a location of capturing or uploading the media files with a location of various users (as recorded by client terminals) and based on the identification of faces of imaged human subject(s) in the media files, according to some embodiments of the present invention.

The present invention, in some embodiments thereof, relates to media content distribution and, more specifically, but not exclusively, to media content distribution based on location.

According to some embodiments of the present invention, there are provided methods and systems of managing storage of media files, such as images, portable network graphics (PNG), joint photographic experts group (JPEG), and graphics interchange format (GIF) files and video files based on imaging of human persons, referred to herein as users, in these media files. The relation may include deletion of a copy in one storage location, for example in a storage (e.g. local storage in a device used to capture the media file or an associated cloud storage) of a user who captured an media file and/or a creation of a copy of the media file in a storage of one or more other users who are imaged in the media files. For brevity, a copy of a media file and a media file may be referred to herein interchangeably. Storage relocation may be performed automatically and/or based on user inputs from the imaged user(s) or the capturing user.

Optionally, content in the media file may be automatically edited based on the identity of the imaged users and/or the social connection thereof to the capturing user and/or the connection therebetween.

Optionally, time and location of users is monitored and logged to allow associating users with media files that may include a visual representation thereof. In such embodiments face recognition function(s) may be applied on selected media files which are matched to a group of users who have been identified to be at a certain location in a certain time. This allows reducing false positive image matching and reducing computational efforts which are required for applying face recognition function(s). Optionally, face segments are locally cropped by applications which are installed on client terminals. This allows centrally processing cropped face segments instead of full media files, reducing the bandwidth which required for matching between media files and users at a server level.

The methods and systems may be used for assisting in protecting the privacy of users, providing tools for commercializing media files, and/or for establishing communication between a user capturing a media file and/or one or more of the users who are imaged in the media file.

According to some embodiments of the present invention, there are provided methods and systems of establishing a chat between one or more users who are imaged media file(s) and/or a user who captured the media file(s). The imaged users may be identified by applying image recognition function(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The methods and systems of the present application provide a technical solution to the problem of lack of knowledge and/or control of subjects who are imaged in media files about these media files. The technical solution involves providing users with tools to manage storage of media files, such as images and videos, and/or automatically establishing chat sessions between users imaged in media files and/or users who captured the media files. The storage management and/or chat establishment may be based on an analysis of spatiotemporal logs documenting location of users during a period and spatiotemporal data documenting when and where the media files were taken. The technical solution may be implemented by one or more servers and/or virtual machines and/or applications as described below.

Reference is now made to FIG. 1 which is a flowchart 100 of a method of managing the storage of media files by matching, in each of various time intervals, a location of capturing or uploading the media files with a location of various users (as recorded by client terminals) and based on the identification of faces of imaged human subject(s) in the media files, according to some embodiments of the present invention. The method allows controlling a public distribution of images and provides a tool that allows photographers to share or sell their products to third parties, for instance by bringing images to their attention. Optionally, the method grants users, human subjects which are imaged in media files captured by other users (or their guardians of the imaged subjects) with control over distribution of copies of these images or with the ability to purchase copies or distribution rights of these images and/or with the ability to chat with the current owner of the media files. In some embodiments of the present invention, images meeting certain conditions, for example images depicting intimate photos, are detected and automatically forwarded for distribution approval. Such images may be detected as known in the art, for example see D. A. FORSYTH, Automatic detection of human nudes, Computer Science Division, University of California at Berkeley, Berkeley, Calif. 94720 which is incorporated herein by reference.

Figure 2:
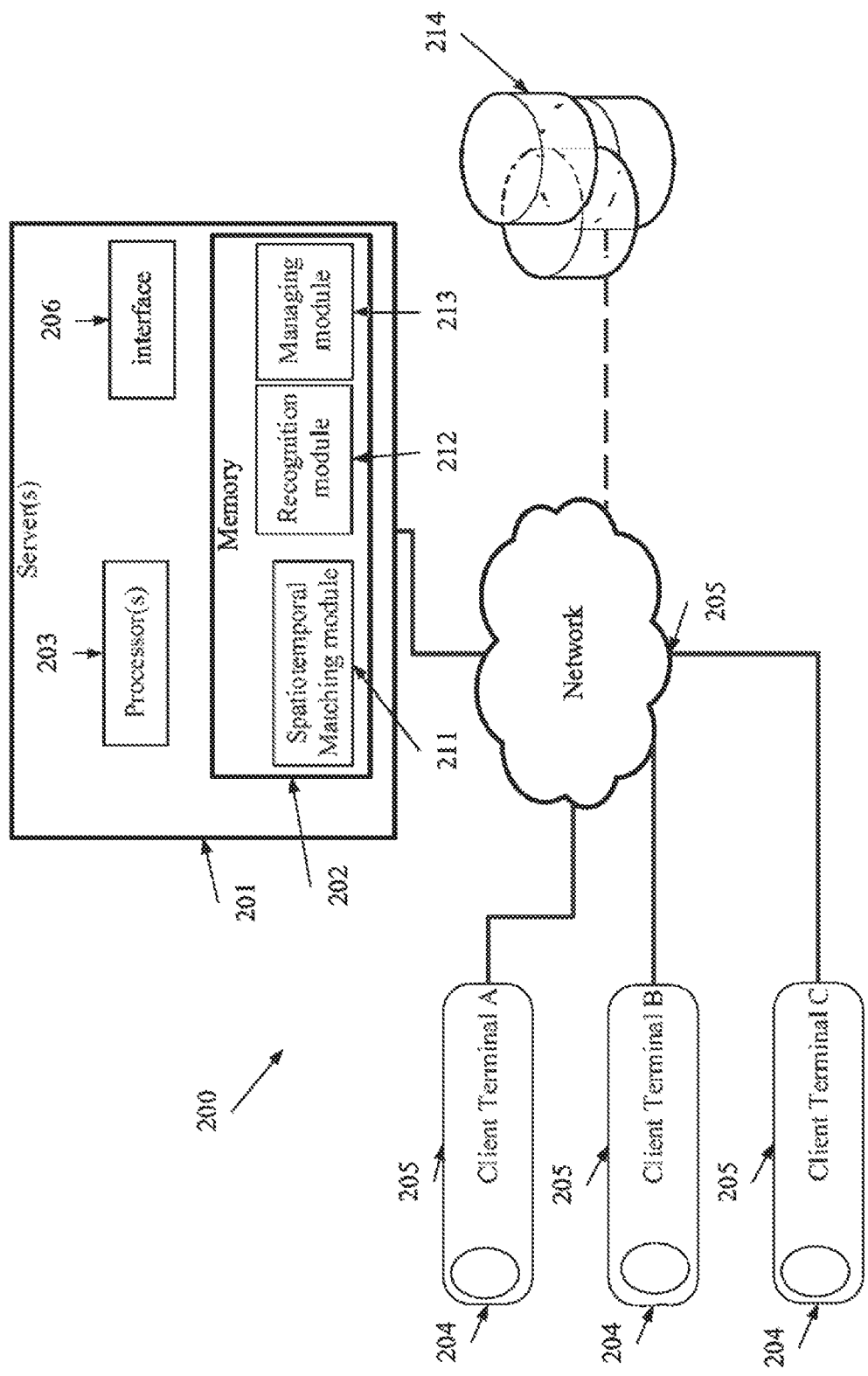
FIG. 2 is a schematic illustration of a system of managing a storage of media files or copies thereof, for example by executing the process depicting in FIG. 1, according to some embodiments of the present invention.

Reference is also made to FIG. 2, which is a schematic illustration of a system 200 of managing a storage of media files or copies thereof, for example by executing the process depicting in FIG. 1, according to some embodiments of the present invention.

The system 200 is optionally implemented on one or more servers and/or virtual machines running on various computing units. The system 200 is implemented on one or more servers 201 which comprise an interface 206, such as a network interface for receiving data and/or media files from client terminals as described below, one or more processor(s) 203 executing recognition module 212, a managing module 213 and a spatiotemporal matching module 211, for example code instructions which are stored in one or more memories 202 of the system 200 and used as described below. The system 200 communicates via a network 205, such as the internet, with client modules 204, for example applications which are installed in a plurality of client terminals 205, for example Smartphones, Smart glasses, wearable devices and/or Smart watches and/or cameras with network connectivity, for instance either wireless or upon wired connection to a computer, devices which are correlated with media files from cameras, for example as described below. The client module may allow users to designate media files by capturing images and/or video files, loading media files from a Gallery, enabling the distribution of media files and/or the like. Optionally, the client module 204 runs a service for automatically recognizing new media files in the device or in storage associated with the user. The client module 204 may be a preinstalled mobile app installed in the client terminal, a preinstalled service, or a post-installed service.

The client module 204 may be embedded in a camera or a computer software module, for instance a browser add-in that runs on images in a defined gallery or folder. The client module 204 may be an application installed in the client terminal such as a smartphone, a tablet, and/or a wearable device, for example an App Store™ application or Play™ application. The client module 204 may be a JavaScript element or AJAX object running on a webpage that has access to media files of the users, for instance a webpage of social media webpage, for checking uploaded media files.

Optionally, one or more database servers 214 are also used for storing face records of users, media files and/or spatiotemporal data logs.

As shown at 101, spatiotemporal data of multiple client terminals is logged, optionally by the plurality of client modules 104 which are installed in a plurality of client terminals 205. As used herein, spatiotemporal data may be a location indication associated with time, for instance location coordinates of a client terminal associated with a timestamp indicating the time during which the location coordinates have been recorded. The spatiotemporal data optionally includes location and optionally time tags which are acquired from location service running on the multiple client terminals 205, for instance Global Positioning System (GPS) units, network based tracking unit, and subscriber identification module (SIM) based tracking unit and/or the like. The logging may be local and/or forwarded to a remote server such as 113, for example continuously or iteratively. Optionally, as shown at 114, spatiotemporal data of users is iteratively acquired and logged and/or forwarded to system 200 for further processing. The spatiotemporal data is optionally forwarded iteratively or continuously or upon event (e.g. location change detected) to the one or more servers 201, via interface 206, from the client terminals 205.

As shown at 102, spatiotemporal data of each of a plurality of media files, such as images and video files, captured by some or all of the client terminals, is extracted, for example by the plurality of client modules 204. Optionally, the client module is an application that includes an image capturing user interface (UI), a connection to the image capturing UI of another application or a native image capturing UI of the hosting client device, and/or an image browsing UI, a connection to the image browsing UI of another application or to an image browsing UI of the hosting client device. These UIs allow a user to capture or designate a media file (e.g. an image, a video, or a graphics interchange format (GIF) and the like), either manually or automatically, for spatiotemporal data extraction, for instance from metadata of the image, for instance based on exchangeable image file format (EXIF) standard. Optionally, as shown at 113, spatiotemporal data captured media files is iteratively acquired and logged and/or forwarded to system 200 for further processing.

This spatiotemporal data is optionally forwarded iteratively or continuously or upon event (e.g. image taken) to the one or more servers 201, via interface 206, from the client terminals 205, optionally with the media files or face segments thereof as described below.

In one example, the client module 204 is an application installed in a mobile device of a user, for example as an application in a Smartwatch, a Smartphone, or Smart Glasses, and a separate image capturing device such as a camera is used for capturing media files. In use, the separate image capturing device is used to capture the media files and to tag the captured media files with at least a timestamp. In parallel, the mobile device, for instance using a location service such as a GPS module or as defined above, is used to log spatiotemporal data and regarding the user, for instance as described below. In such embodiments, media files which are by the separate image capturing device may be tagged with an estimated capturing location based on a time match between the logged spatiotemporal data and the time stamps. The tagged media files may now be analyzed to detect proximity events, for example as described below. This embodiment allows using image capturing devices without integral location service module, such as a GPS module, to be used for capturing media files which are matched according to the herein described processes. For example, a spatiotemporal data log loaded from the client module 204 is used for enhancing media files captured with an independent digital camera (e.g. Nikon D750 DSLR) and loaded to a computer together with the client module 204.

Now, as shown at 103, a spatiotemporal proximity of one or more of the users to the capturing geographical location at the capturing taking time of one or more of the media files which are captured by some or all of the client terminals is detected, for instance using the matching module 211. For instance, a match between the spatiotemporal data of each image or video documented in the system 200 is matched with the logs which document where and when users visited at different geographical locations. This allows detecting a user group of potential users who may have been caught in an image group of the media files as a spatiotemporal proximity thereof to the event of capturing one of the media files was identified. The media files which are captured by some or all of the client terminals may be locally stored in the capturing client terminals or in a storage allocated to the users of the client terminals, for example associated with the users of the client terminals. For example, an image captured by a first user and stored in cloud storage of the account of the first user is accessed for detecting spatiotemporal proximity as described above.

Optionally, while the media files are stored in the memory of the client terminals, the matching between spatiotemporal data of users and spatiotemporal data of media files is done by the spatiotemporal matching module 211 located at the server(s) 201 of the system. In such embodiments, only the spatiotemporal data of media files may be forwarded to the spatiotemporal matching module 211 to reduce the bandwidth required for spatiotemporal proximity detection.

Additionally or alternatively, a log of available access points or wireless connections may be registered with time stamp per user, for instance by the installed client application and/or per media file, for instance as detected by the imaging device at a time of imaging and/or shortly before or after. The log may include Wi-Fi access points, mobile device signals such as Wi-Fi indicators, Bluetooth and/or Near Field Communication (NFC) signals. A spatiotemporal proximity may be detected when the log of an image and the log of the user register the same access point(s) or wireless connection(s) at the same or about the same time frame.

Additionally or alternatively, a detection of one spatiotemporal proximity related to one image may be indicative of another spatiotemporal proximity related to another image taken by the same photographer and/or device.

Image objects in one image may be used to correlate another with the same imaged users, for instance presence of a unique shirt or sunglasses in two images taken about the same time. Social correlation may also be used for correlating between images and users, for instance as described below.

Now, as shown at 104, recognition(s) functions such as face recognition(s) functions and/or voice recognition(s) functions are applied to identify, check or authenticate the presence of member(s) of the user group in the media files of the image group. For example, face records of members of the user group may be used for identifying which (if any) member(s) of the user group are imaged in each of the media files of the image group. Each face record is indicative of one or more face features or a face signature of one of the users. In use, the one or more face features or the face signature are used for scanning the respective media files and to determine whether the respective user is imaged or not. Face features of a face record are optionally acquired by analyzing one or more images or video files loaded by a user during a subscription process. Additionally or alternatively, object records of members of the user group may be used for identifying which (if any) member(s) of the user group are present in each of the media files of the image group. Each object record is indicative of one or more features or an object signature of one of the users. The objects may be a shirt, a logo, an icon, a car, a horse, a dog, sunglasses, and/or any item which is associated with a user. Additionally or alternatively, voice records of members of the user group may be used for identifying which (if any) member(s) of the user group are recorded talking in each of the media files of the image group. Each voice record is indicative of one or more voice features or a voice signature of one of the users. A voice recognition algorithm may be used, for instance dynamic time warping (DTW) or any other technique to find an optimal alignment between two given time-dependent sequences under certain restrictions.

Optionally, the check stage depicted in 104 is held by the servers 201, for example by the recognition module 212. As indicated above, the media files may be stored in the memory of the client terminals. In order to allow the recognition module 212 to check whether users from the user group are imaged in the images of the image group with limited bandwidth and with distributed computing, faces in each relevant media image may be locally identified and cropped by the client module 204 and transferred to the recognition module 212. Cropping may be dome from frames of locally stored video files or from images. In such embodiments, the recognition module 212 matches the cropped faces with the face records for detection of a match. This also allows reducing the bandwidth (e.g. mainly in video files) and/or privacy violation of the users imaged in the media files, for instance due to a security breach to a central storage location and/or the like. An image checked as described in 104 and captured by one user and depicts another user may be referred to herein as a matched media file.

Optionally, a social connection between the users who are imaged in a matched media file, hereinafter matched users, and the user who captured the image, hereinafter a capturing user, are identified and classified. The social connection may be queried using an API call of a social media. The social connection may be identified by crawling records in a social network dataset. For example, connections between participants in online social networks are analyzed. For example, am online social network connections can be represented as a graph (nodes represent users, edges represent social connections) and the graph is analyzed to classify relationship between the users (friends, friends of friends, and/or the like). Optionally, a relocation scheme is determined based on whether the social connection is friends, friends or friends, or other users with remote or no social connection. The relocation scheme may be automatic media file storage relocation, semi-automatic media file storage relocation, for example relocation based on approval, and/or conditional media file storage relocation, for example relocation only when the imaged user matches one or more characteristics. It should be noted that the term relocation may be used to describe, a deletion of a file and optionally the storage of a copy thereof in another storage location, for example as described below. Additionally or alternatively, the social connections may be used to improve matched media files search, for instance by using face records of friends or friends or friends for checking which (if any) member of the user group of proximate users is imaged in the media files of the image group.

According to some embodiments of the present invention, the recognition module 212 analyzes the media files to verify properties of the segment of the media file wherein the users imaged are imaged, for example a segment of a video or an image. The properties may include: a face size, a face location in the image or frame area, gazing direction of the imaged face, an angle of the face in relation to the line of sight of the capturing element of the client terminal, the relation between the focused area in the media file and the segment, a location of the face in the general composition of an image or a face and/or the like. These properties may be used for applying different relocation rules on media files which image matched users in the background and images which image matched users as the main subject(s).

According to some embodiments of the present invention, the recognition module 212 analyzes a media file to identify segments of a video or areas in an image in which an imaged human subject is imaged. This allows trimming or otherwise processing the media file to create a processed copy of the media file based on the presence or absence of imaged human subjects therein. For example, a summary version of the media file that includes only segments or areas of the media file with the imaged human subject and/or a filtered version of the media file that includes only segments or areas of the media file without the imaged human subject. In such a manner, only the summary version may be forwarded to the imaged human subject as described below and/or only the filtered version may be stored for the user who operates the client terminal used for capturing the media file to access, for instance as described below.

According to some embodiments of the present invention, the recognition module 212 correlates between recognition algorithm outputs, location and history of the user capturing the media content to find imaged users. Weighting for identification may be based on whether the imaged users have been already pictured by images of the user capturing the media content or not, on the access to location data, and/or the like. Statistical classifiers may be used.

Now, as shown at 105, a media file storage relocation process during which a storage location of media files is changed and/or a media file editing process during which media files are edited to remove or disguise user(s) imaged in the media file, either automatically or semi automatically. When executing the media file storage relocation process, a copy or a processed copy (for brevity referred to herein as a copy) of a media file is stored at a storage accessed and/or used by users who are imaged in the media files. Optionally, a copy of a media file is stored at a storage of an account of a first user who operates a client terminal used for capturing the media file (e.g. a camera or a smartphone), for example in a cloud account of the first user, is relocated and/or edited. The relocation may be to storage of an account of a second user imaged in the media file, for example in a cloud account of the second user. In another example a copy of a media file is stored at a storage of a client terminal of a first user which was used for capturing the media file (e.g. a camera or a smartphone), for example in a Solid state drive of a smartphone. In this example the relocation is to storage of a client terminal of a second user imaged in the media file, for example in a microSD card of a tablet of the second user. The editing may be done to a local copy of the media file at the capturing device or in a library accessible to the user.

Figure 3:
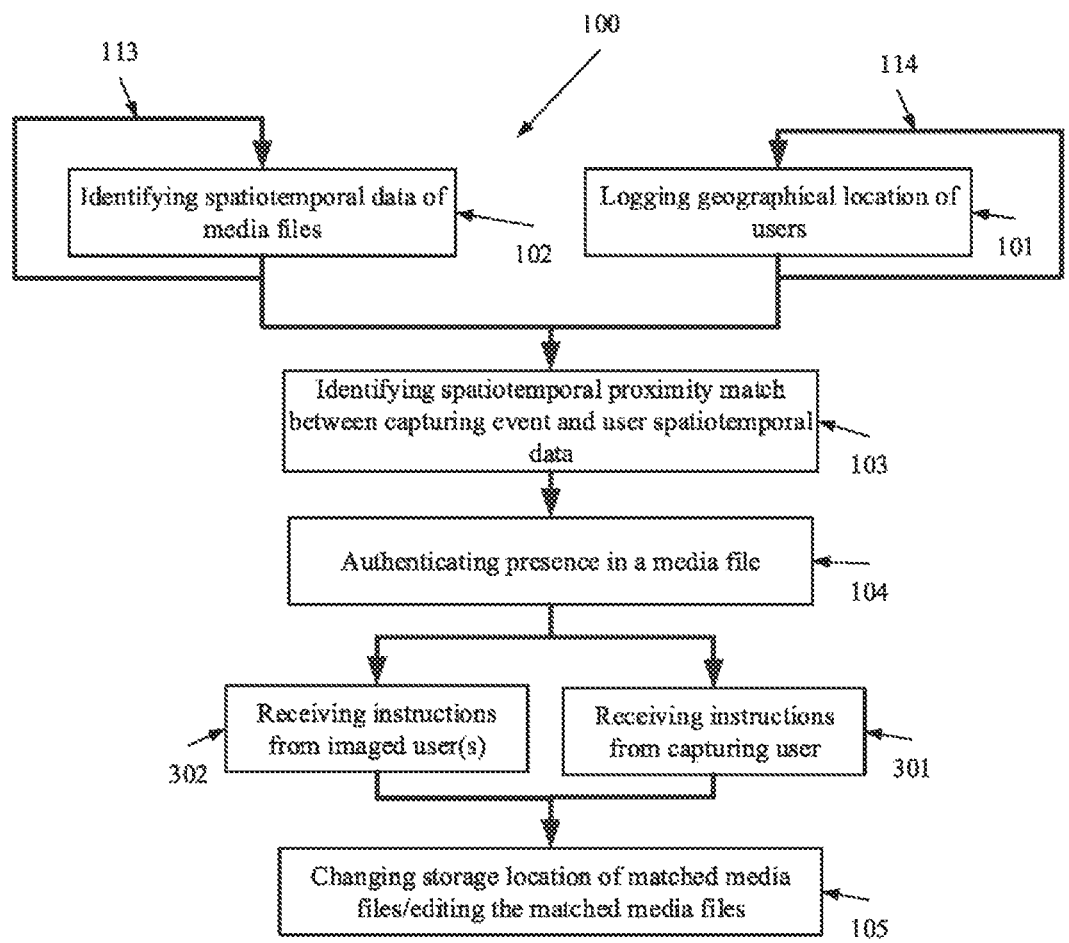
FIG. 3 depicts a process similar to the process depicted in FIG. 1; however, in FIG. 3 sub processes wherein user instructions are acquired for determining whether a storage location of a media file is changed or not are depicted, according to some embodiments of the present invention.

According to some embodiments of the present invention, a relocation of a matched media file is determined based on an input from the capturing user and/or the imaged users. For example, FIG. 3 depicts a process similar to the process depicted in FIG. 1; however, in FIG. 3 301 and 302 depict two sub processes wherein user instructions are acquired for determining whether a storage location of a media file is changed or not. As used herein a relocation means a full relocation of the matched media file or a partial relocation of the matched media file, for example a relocation of selected segments of a video file or areas in an image divided based on the presence or absence of the imaged users therein.

Optionally, as shown at 301, when a matched media file is detected, the user of the client terminal who captured the matched media file may be notified to approve the image storage relation. For example, the user is presented with a notification indicative that one of the media files in his storage is a matched media file that images another user. Optionally, the notification is an interface GUI that allows the user to confirm a relocation of storage or ignore the matching, for example by presenting selection buttons and/or receiving fingertip gestures.

Additionally or alternatively, imaged users who are imaged in a matched media file are notified about the matched media file. Optionally, once a matched media file is detected, for instance as described above with reference to 104, a message with a copy or a link to storage of the imaged user(s) is sent to the imaged user(s). For example, the message may be sent from the managing module 213 to an imaged user, notifying the imaged user about the matched media file and allowing him to instruct a relocation of the media file, for example to instruct a deletion of the media file from its current storage location and optionally to store a copy in a storage associated with him, for example as described above. Additionally or alternatively, the imaged user can give feedback to the photographer, for example rank the matched media file and/or mark the image with like or dislike tag.

In one example, the user is presented with a preview of the matched media file, for example a thumbnail, may be presented together with a button for acquiring a copy, deleting the source copy at the remote location and/or acquiring a copy and maintaining the source copy at the remote location.

Additionally or alternatively, the imaged user in the source image may be identified and cropped, blurred, and/or otherwise masked in response to an input the imaged user provides. In such embodiments, the imaged user has a control on the specific portion of the image wherein he is imaged. For instance, the face segment of an image or a frame is blurred in response to a user input.

Additionally or alternatively, the capturing user is associated with the media file to allow him to follow publication and/or distribution of the image by the imaged user(s). For instance, when the image is posted in a social network page, the capturing user is tagged or otherwise marked. In such a manner, the capturing user is exposed to reactions to his captured image. In such embodiment, a user capturing distributed media file may benefit from the distribution of the media files, for example from the publication and/or for a fee dependent on the distribution, without having an ownership on a copy of the media files and/or without managing the distribution by himself. In another example, an identifier, such as a watermark, a layout, and/or an icon, for instance a profile image, is added to the matched media file. In such a manner, an exposure to the matched media file promoted by the imaged user(s) brings exposure to the capturing user and/or the capturing user brand. The watermark, the layout, and/or the icon may be taken from the user profile.

Additionally or alternatively, images in a gallery of images of a folder of images are tagged with information about the capturing user, information about the imaged users and/or information indicating whether the images where distributed and optionally to who. For example to which of the subscribers of the system. This allows the gallery owner to track image distribution to users. Optionally, reaction of users to the image is also added to the items of the gallery of images. For example number of like taggings and reactions.

Optionally, the system 200 allows capturing users to monetize their media files by setting a price for relocating copies of media files and/or for distributing media files. In such embodiment, a billing module is used for managing financial transactions between imaged users and capturing users. For example, when a matched media file is detected, a message is forwarded to the imaged user to allow him to purchase the matched media file, either for a fixed price or for a price set by the capturing user, for instance for the specific matched media file or to images matching certain conditions. For example, the billing module charges imaged user for the matched media file and credits the capturing user for a relocation of the media file. In an exemplary scenario, photographers in public events can capture media files and load them to the system 200 which distribute them to imaged users as described above. When an imaged user agrees to a price for receiving a copy of the image, a transaction can be completed.

Figure 4:
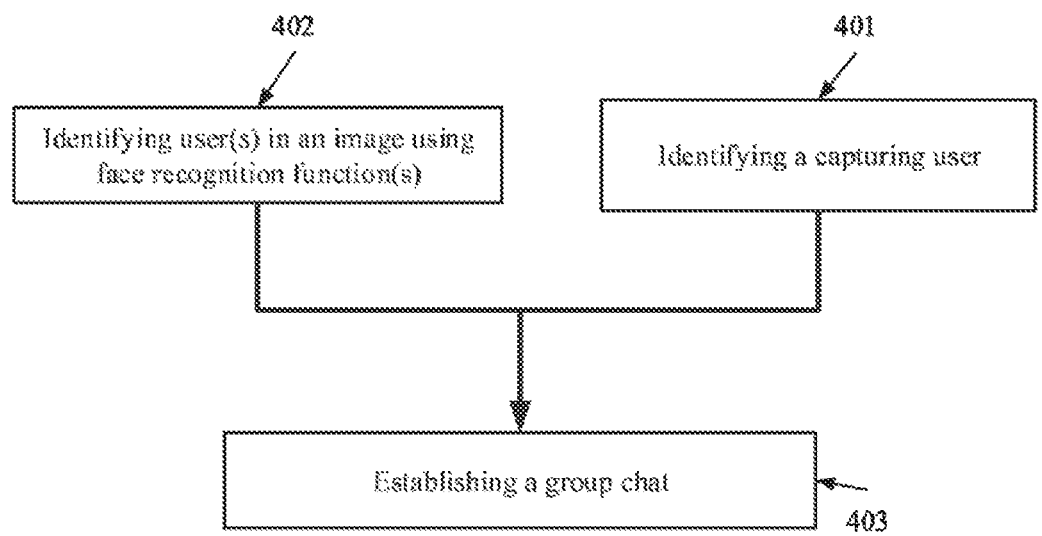
FIG. 4 is a method of establishing a chat session between a plurality of users who are imaged in one or more media files and/or the user capturing the media files, according to some embodiments of the present invention.

FIG. 4 is a method of establishing a chat session between a plurality of users who are imaged in one or more media files and/or the user capturing the media files, according to some embodiments of the present invention. Optionally, the chat session is established between users who are imaged in one or more images captured in a common time and proximate locations and/or the user who captured the images. The depicted process allows establishing a chat and/or a group chat so as to allow the imaged user(s) and/or the capturing user to discuss the one or more media files which are taken in a common time and proximate location and/or the event recorded in the one or more images. Optionally, the process is applied on media files which are taken in a common time and proximate location and the users who are imaged in these one or more media files are identified as described above with reference to 101-104.

As shown at 402-401 the identity of users who are imaged in media file(s) and optionally the identity of a capturing user capturing the media file(s) depicting the imaged users are identified. The imaged users may be identified by applying a face recognition function on a media file, with or without spatiotemporal data matching. This allows, as shown at 403, to establish a chat session. Optionally, chat user interfaces are displayed on a display of client terminals of the capturing user and/or one or more of the imaged users for establishing a chat session. The chat user interfaces may be a classic instance messaging GUI. This allows the capturing user and/or one or more of the imaged users to exchange messages using the chat user interfaces and displaying the exchanged messages on the client terminals during a chat session.

Optionally, a chat module (not shown) installed in the server(s) 201 of the system 210 is used for managing the chat session between the imaged user(s) and/or the capturing user by establishing a chat session therebetween, optionally in a web document or a window of an application such as the client module 204 that includes both the image and a chat GUI. In one example, the capturing user and the imaged user(s) are added to a chat session wherein the matched media file is presented, for example as a background, as a chat input from the capturing user, and/or in a designated area. In another example, the imaged users may discuss an event they experienced together. Optionally, one or more of the users are defined as chat managers that may add or remove users from the chat. Optionally, the chat session is established in addition to the process described in FIG. 1 or FIG. 3. Alternatively, the chat session is established independently from the storage relocation process.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term face recognition function, location service, spatiotemporal data, and processor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of managing at least one of a media file storage for protecting privacy of users imaged in media files, comprising:
   receiving data about capturing or uploading geographical location and time of at least one media file, the at least one media file is stored in a current storage location of a first account associated with a first user, said data is acquired by recording outputs of a location module of a client terminal of the first user;
   using said capturing or uploading geographical location and time to identify a spatiotemporal proximity of a second user during said capturing or uploading time;
   detecting that said second user is imaged in said at least one media file using a recognition function; and
   in response to said detecting transferring said at least one media file from the current storage location to a new storage location of a second account associated with said second user.

2. The method of claim 1, in response to said detecting initiating a media file storage relocation process wherein at least one first copy of the at least one media file is deleted from the first account and a second copy of the at least one media file is created and stored in the new storage.

3. The method of claim 2, further comprising identifying a social connection between said first user and said second user and managing at least one of said media file storage relocation process and an editing process according to said social connection.

4. The method of claim 2, further comprising acquiring from said first user an approval to said media file storage relocation process and managing at least one of said media file storage relocation process and an editing process according to said approval.

5. The method of claim 2, further comprising:
   presenting said at least one media file to said second user on a graphical user interface;
   acquiring a reaction to said at least one media file via a selection on said graphical user interface from said second user; and
   managing at least one of said media file storage relocation process and an editing process according to said reaction.

6. The method of claim 5, wherein said presenting comprises presenting at least one thumbnail of said at least one media file to said second user on said graphical user interface.

7. The method of claim 2, further comprising managing a financial transaction between said first user and said second user and managing at least one of said media file storage relocation process and an editing process according to said financial transaction.

8. The method of claim 1, in response to said detecting initiating an editing process and said at least one media file comprises at least one video file; wherein during said editing process said at least one video file is edited to remove video segments wherein said second user is imaged.

9. The method of claim 1, in response to said detecting initiating an editing process and said at least one media file comprises at least one video file; wherein during said editing process said at least one video file is edited to remove video segments wherein said second user is not imaged.

10. The method of claim 1, wherein said recognition function comprises a face recognition function which is applied using a plurality of face records each indicative of at least one facial feature of said second user.

11. The method of claim 1, wherein said recognition function is a voice recognition function.

12. The method of claim 1, further comprising establishing a chat session between said first and second users.

13. The method of claim 1, wherein the first and second accounts are cloud storage accounts.

14. The method of claim 1, further comprising establishing a chat session between said first and second users.

15. The method of claim 1, wherein said current storage location is on one of a plurality of client terminals and said new storage location is on another of said plurality of client terminals.

16. The method of claim 15, wherein said plurality of client terminals comprises a plurality of smartphones.

17. The method of claim 1, further comprising:
   receiving an image segment depicting at least one face and cropped from the media file,
   wherein said detecting is performed by applying said face recognition function on said image segment.

18. The method of claim 1, further comprising: monitoring a distribution of said media file in at least one social media network, and updating said first user about said distribution.

19. The method of claim 1, further comprising: adding an identifier selected from a group consisting of a watermark, a profile image, a layout, and an icon to the said at least one media file.

20. A non transitory computer readable medium comprising computer executable instructions for executing a method of for protecting privacy if users imaged in media files, the instructions comprising:
- instructions for receiving data about capturing or uploading geographical location and time of at least one media file, the at least one media file is stored in a current storage location of a first account associated with a first user, said data is acquired by recording outputs of a location module of a client terminal of the first user;
- instructions for using said capturing or uploading geographical location and time to identify a spatiotemporal proximity of a second user during said capturing or uploading time;
- instructions for detecting that said second user is imaged in said at least one media file using a recognition function;
- instructions for, in response to said detecting, transferring said at least one media file from the current storage location to a new storage location of a second account associated with said second user.

* * * * *